US008938603B2

(12) United States Patent
Haswell (10) Patent No.: US 8,938,603 B2
(45) Date of Patent: Jan. 20, 2015

(54) CACHE SYSTEM OPTIMIZED FOR CACHE MISS DETECTION (75) Inventor: Jonathan M. Haswell, San Jose, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 192 days.

(21) Appl. No.: 13/485,812

(22) Filed: May 31, 2012

(65) Prior Publication Data
US 2013/0326154 A1 Dec. 5, 2013

(51) Int. Cl.
*G06F 12/12* (2006.01)
*G06F 17/30* (2006.01)
*G06F 12/08* (2006.01)

(52) U.S. Cl.
CPC ...... *G06F 17/30949* (2013.01); *G06F 12/0864* (2013.01)
USPC .......................................... 711/216; 711/133

(58) Field of Classification Search
CPC ............ G06F 12/121; G06F 17/30949; G06F 17/0864
USPC .................................. 711/141, 146, 216, 133
See application file for complete search history.

(56) References Cited

U.S. PATENT DOCUMENTS

2008/0155229 A1\* 6/2008 Beyer et al. .................... 711/216
2008/0209133 A1\* 8/2008 Ozer et al. ..................... 711/146
2008/0243941 A1\* 10/2008 Beyer et al. .................... 707/200

OTHER PUBLICATIONS

Fleck, Margaret, "Hash Functions", dated Spring 2000 and accessed Jul. 23, 2014 at http://www.cs.hmc.edu/~geoff/classes/hmc.cs070.200101/homework10/hashfuncs.html.

\* cited by examiner

*Primary Examiner* — Thanh Nguyen
(74) *Attorney, Agent, or Firm* — Sughrue Mion, PLLC (57) ABSTRACT According to an embodiment of the invention, cache management comprises maintaining a cache comprising a hash table including rows of data items in the cache, wherein each row in the hash table is associated with a hash value representing a logical block address (LBA) of each data item in that row. Searching for a target data item in the cache includes calculating a hash value representing a LBA of the target data item, and using the hash value to index into a counting Bloom filter that indicates that the target data item is either not in the cache, indicating a cache miss, or that the target data item may be in the cache. If a cache miss is not indicated, using the hash value to select a row in the hash table, and indicating a cache miss if the target data item is not found in the selected row.

24 Claims, 8 Drawing Sheets

CACHE SYSTEM OPTIMIZED FOR CACHE MISS DETECTION

FIELD OF THE INVENTION

The present invention relates to cache systems and in particular to cache systems optimized for cache miss detection.

DESCRIPTION OF RELATED ART

A solid state drive (SSD), as is common for most storage devices such as a hard disk drive (HDD) and storage controllers, maintains a cache of recently read or written data. As such, subsequent read operations can be serviced faster if they request data that is already in the cache. Further, write operations can be aggregated, coalesced and the writing application allowed to continue processing before the data is written to the storage media. All read and write operations require a storage device to search the cache. However, the vast majority of these searches do not find the target data in the cache, as most workloads are random and caches are small.

BRIEF SUMMARY

Embodiments of the invention relate to cache systems for storage systems. In one embodiment, the present invention provides a cache optimized for cache miss detection by organizing the cache such that a search which results in a miss is significantly faster than a cache search that results in a hit, in most cases. According to the invention, an embodiment of cache management comprises maintaining a cache comprising a hash table including rows of data items in the cache, wherein each row in the hash table is associated with a hash value representing a logical block address (LBA) of each data item in that row.

Searching for a target data item in the cache includes calculating a hash value representing a LBA of the target data item, and using the hash value to index into a counting Bloom filter that indicates that the target data item is either not in the cache, indicating a cache miss, or that the target data item may be in the cache. If a cache miss is not indicated, using the hash value to select a row in the hash table, and indicating a cache miss if the target data item is not found in the selected row.

These and other features, aspects and advantages of the present invention will become understood with reference to the following description, appended claims and accompanying figures.

DETAILED DESCRIPTION OF THE INVENTION

Embodiments of the invention relate to cache systems for storage systems. In one embodiment the present invention provides a cache optimized for cache miss detection by organizing the cache such that a search which results in a miss is significantly faster than a cache search that results in a hit, in most cases. This is useful as most cache data access operations result in a miss.

In one embodiment of the invention, a cache search process comprises three phases. In a first phase, a hash function is used to calculate an N bit hash value representing the LBA (Logical Block Address) of a target data item being searched for in the cache.

In a second phase, the N bit hash value is used as an index into a modified form of a Bloom filter. N is selected to enable the hash value to address any bucket in the Bloom filter. The Bloom filter indicates that either the LBA of the target data item is not in the cache or that it may be in the cache. If the indication is that the LBA is not in the cache then the search process stops as there is a cache miss.

In a third phase, M bits of the hash value are used as row index into a hash table, wherein M<N. The hash table is structured with a list of the entries as a chain (or row) for each hash value. The chain associated with the hash value is searched to determine if the target data item is in the hash table. If the target data item is in the chain in the hash table, then there is a definite cache hit. If the target data item is not found in the chain in the hash table, there is a cache miss.

According to an embodiment of the invention, a relationship is established between the Bloom filter and the hash table. The Bloom filter allows avoiding search of the hash table in many cases. Further, the hash table provides efficient update of the Bloom filter when items are removed from the cache.

Figure 1:
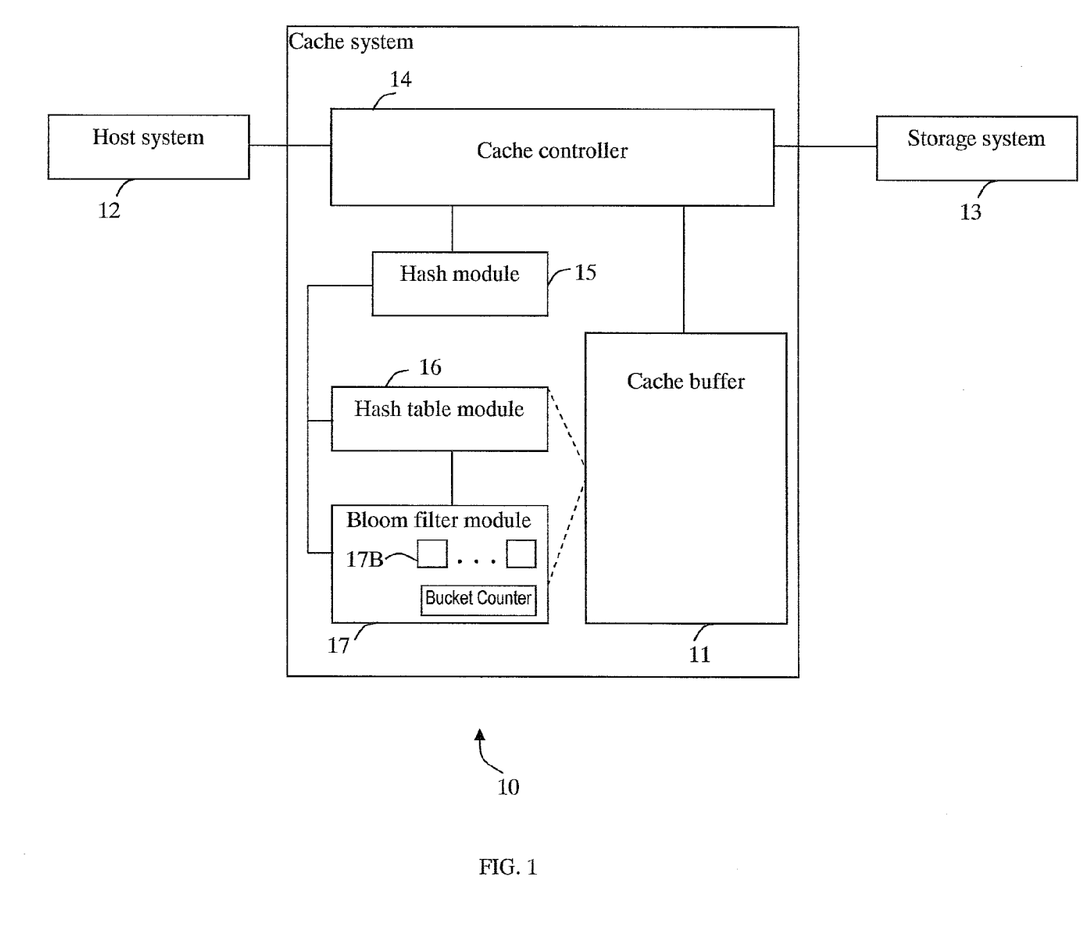
FIG. 1 shows a block diagram of a cache system for a storage system, according to an embodiment of the invention.

An example implementation of an embodiment of the invention is described hereinbelow in relation to the drawings. Referring to FIG. 1, a cache system 10 comprises a cache buffer 11 (i.e., cache) which is a high speed memory buffer inserted between a host system 12 and a storage system 13 (e.g., solid state drive media), to store recently accessed data.

The cache system 10 further comprises a cache controller 14 which utilizes a data table and control bits for cache management and access control. The cache controller searches the table to fetch and store data blocks in the cache, and uses a replacement strategy to determine which data blocks to retain in the cache buffer and which to discard.

According to an embodiment of the invention, the cache controller 14 provides cache searching optimized for cache miss detection. The cache 11 is organized such that a search which results in a miss is significantly faster than a cache search that results in a hit, in most cases. As shown in FIG. 1, the cache system 10 further comprises a hash module 15 implementing a hash function, a hash table module 16 comprising a hash table and a Bloom filter module 17 comprising a counting Bloom filter.

The Bloom filter module 17 is configured such that each bucket comprises a counter utilizing saturating arithmetic. When an item is stored in the cache the bucket representing that LBA is incremented. When an item is removed from the cache the bucket representing that LBA is decremented. However, if the counter is saturated it cannot be decremented but must be recalculated by scanning the hash table. As such, if a bucket count is saturated, a corresponding bucket count is recalculated by scanning only the row in the hash table associated with the bucket being recalculated.

The cache system 10 combines the use of the Bloom filter with the hash table, and utilizes the same hash function for the hash table and the Bloom filter. Further, the cache system 10 utilizes a fixed relationship between N Bloom filter buckets and a single row in the hash table to reduce the performance penalty of a Bloom filter bucket saturating, which will result in needing to recalculate the value of the bucket when an item is removed. This provides the ability to scale the speed of detecting cache misses versus the memory utilized by the Bloom filter.

In one embodiment, the hash module 15 utilizes a hash function of N bits. Any hash function can be used that can ingest a value range that matches the LBA range that the cache holds, and can output N bits. N is selected large enough to cover the number of buckets that are defined in the Bloom filter (as detailed further below). Further, the hash function provides random output distribution and is computationally efficient. An example hash function is the known multiplication hash function.

Figure 2A:
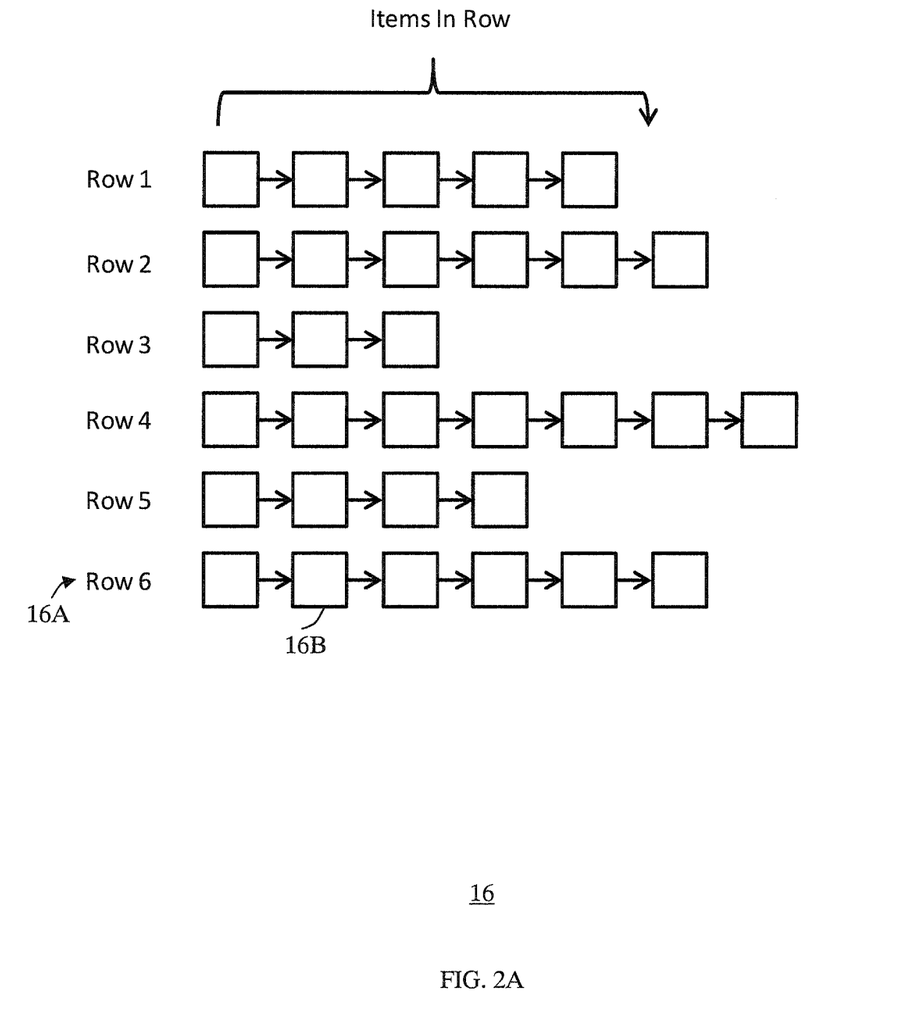
FIG. 2A shows a hash table structure for the cache system, according to an embodiment of the invention.

As shown by example in FIG. 2A, in one embodiment the hash table module 16 comprises a classic hash table including rows 16A of data items 16B. All data items 16B in each row 16A (e.g., Row 1, . . . , Row 6) are maintained in a list. Each row 16A includes a list of the data items 16B in the cache that correspond to the hash value associated with that row.

To find a data item in the hash table, a hash value is generated by the hash module 15 for the data item, and the hash value output of the hash module 15 selects a row 16A in the hash table. Then, the list of data items 16B for the selected row is scanned for the data item being searched.

In one embodiment, the Bloom filter module 17 comprises a classic Bloom filter that includes a bitmap. When an item is added to the set that the Bloom filter represents, a hash function is used to map the item to a bit in the bitmap, which is then set. To search for an item in the set, the hash function is calculated and if the bit that it indicates is not set then the item is not in the set. If the bit is set the item may be in the set (however, due to the risk of a hash collision the answer is not definitive).

An adaption of a Bloom filter is a counting Bloom filter wherein each bit in the bitmap is replaced with a counter, wherein each counter is referred to as a bucket. When an item is added to said set, then the counter pointed to by the hash function is incremented, and when an item is removed the counter is decremented. In most Bloom filters a very large number of bits or counters are used to increase their accuracy in detecting a miss. This leads to large amounts of memory usage, particularly if each counter has sufficient bits to contain the 'worst case' where every item added to the set hashes to the same counter.

To reduce such memory usage, only a small number of bits is used and each counter uses saturating arithmetic counting. A saturating counter, when set to its maximum value and then incremented, does not change its value but stays at the maximum value. Hence, even if the counter is not able to contain the total number of items that it represents, it will still be useful in the context of a Bloom filter when performing a search to indicate that an item being searched is not a miss.

On the other hand, once a counter has saturated, it cannot be decremented. For example, if a 4-bit counter is used (which has a maximum value of 15), then if it is incremented from zero 17 times, it will contain the value of 15. If the counter had been incremented from zero 20 times, then it will also contain 15. Hence, when decrementing a counter with a value of 15, it is unclear if the counter should stay at 15 or be decremented to 14. In the classic Bloom filter, the only solution is that when a saturated counter has to be decremented, the entire counter has to be regenerated by scanning the entire input set (i.e., counting all the items again).

According to an embodiment of the invention, cache implementation comprises setting up a hash table and a counting Bloom filter wherein the Bloom filter has a significantly larger number of entries, or buckets, than the hash table has rows. Specifically, the number of buckets in the counting Bloom filter is an integer multiple of the number of rows in the hash table. For example, if the hash table has 256 rows 16A then the bloom filter should have e.g., 2048 buckets (i.e., 8 buckets for every row 16A in the hash table).

As described further below, a hash function is utilized to create a fixed relationship between each row 16A in the hash table 16 and a set of buckets in the Bloom filter (i.e., if an item 16B is placed in a specific row 16A of the hash table 16, then that item 16B is represented in one of the buckets in the Bloom filter that represents that row 16A).

Figure 2B:
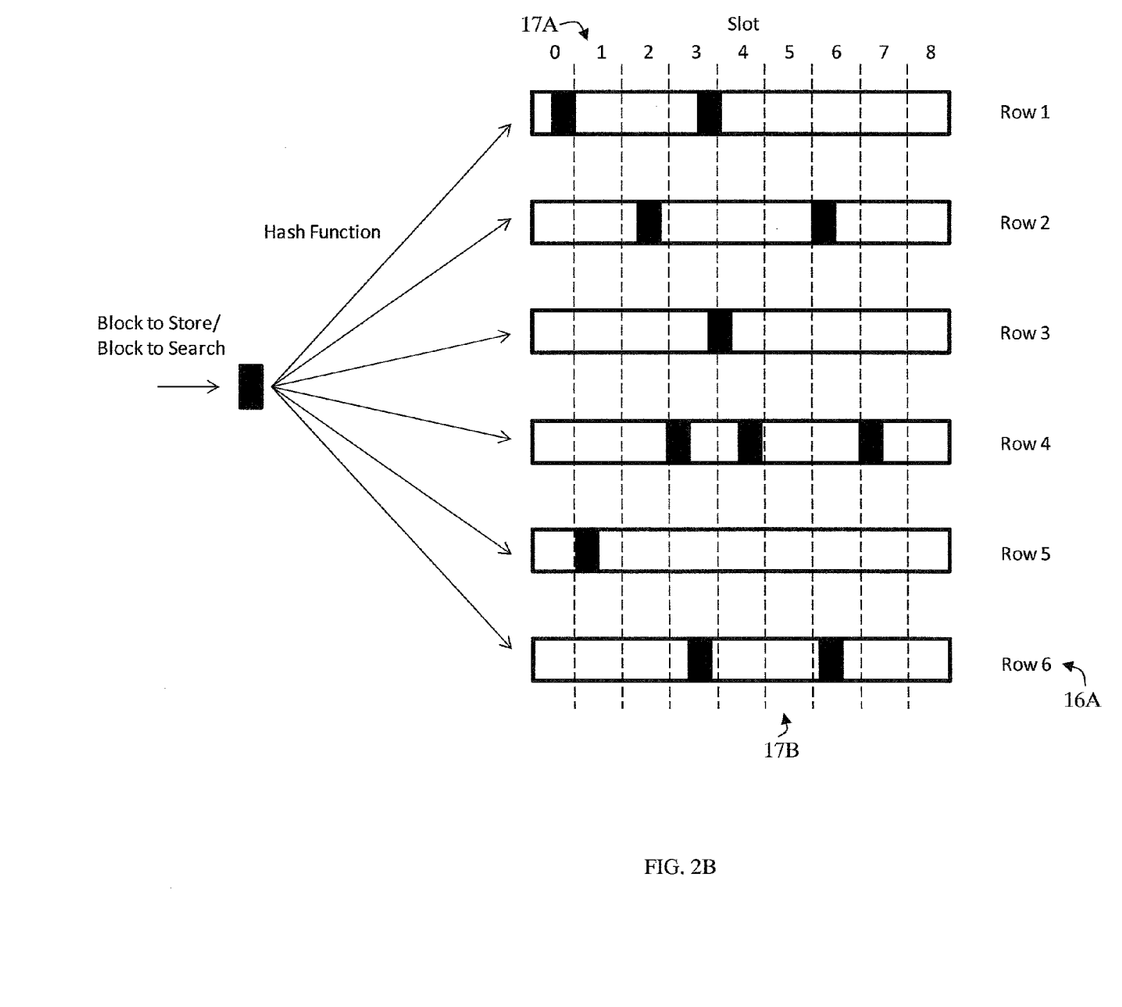
FIG. 2B illustrates a relationship between hash table and Bloom filter structures of the cache system, according to an embodiment of the invention.

As shown in FIG. 2B, each row 16A of the hash table 16 can be divided into a series of slots 17A (e.g., Slot 0, Slot 1, . . . , Slot 8), representing regions of the LBA space, where each slot 17A is represented by one bucket 17B in the Bloom filter 17. A hash function generates a hash value based on a data item (e.g., data block) to be searched (or stored) in the cache hash table.

Figure 3:
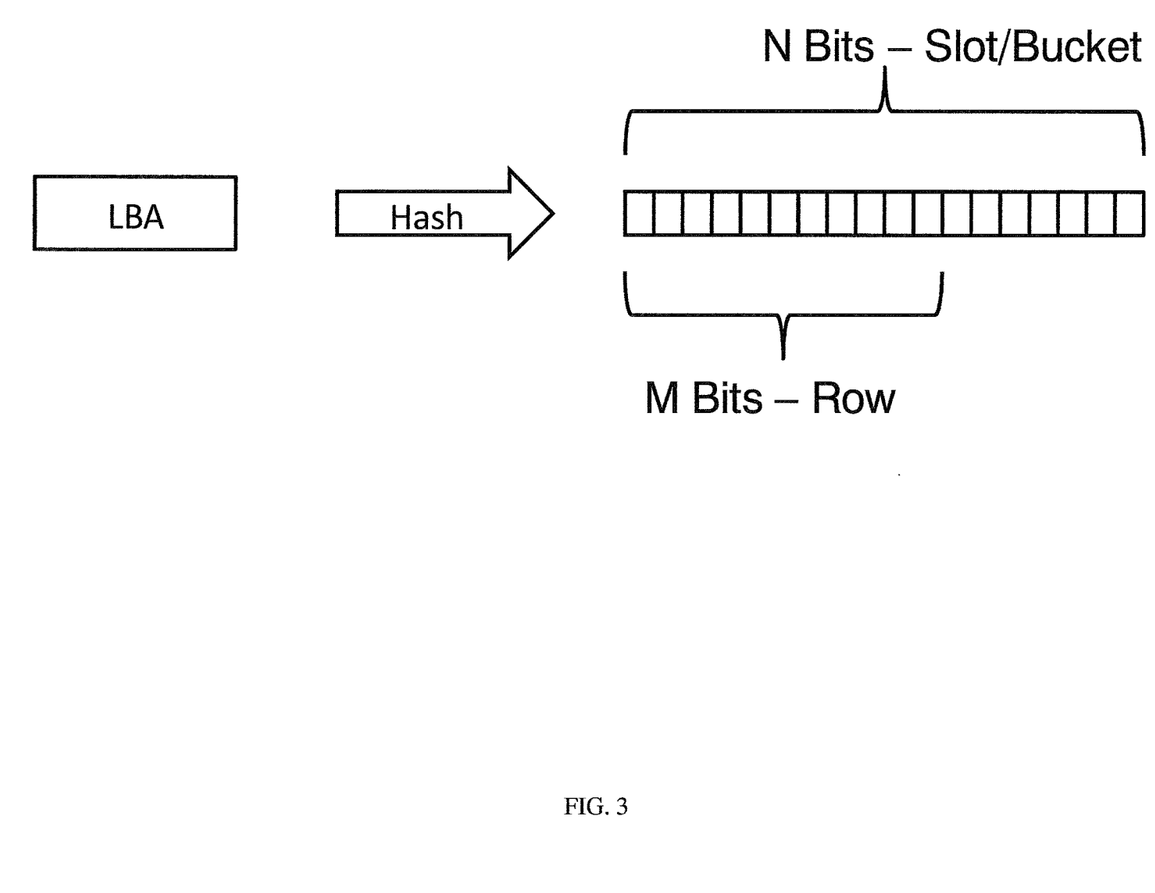
FIG. 3 illustrates a relationship between buckets in the Bloom filter and row/slots in the hash table of the cache system, according to an embodiment of the invention.

As illustrated by example in FIG. 3, a relationship is established between buckets in the Bloom filter 17 and row/slots in the hash table 16 utilizing a single hash function for both. In one example, for 8 Bloom filter buckets per row 16A in the hash table 16, and 256 rows 16A, then the hash function outputs 12 bits. All 12 bits are used to identify a bucket 17B in the Bloom filter 17, but only 8 of the bits are used to identify a row 16A in the table 16.

Figure 4:
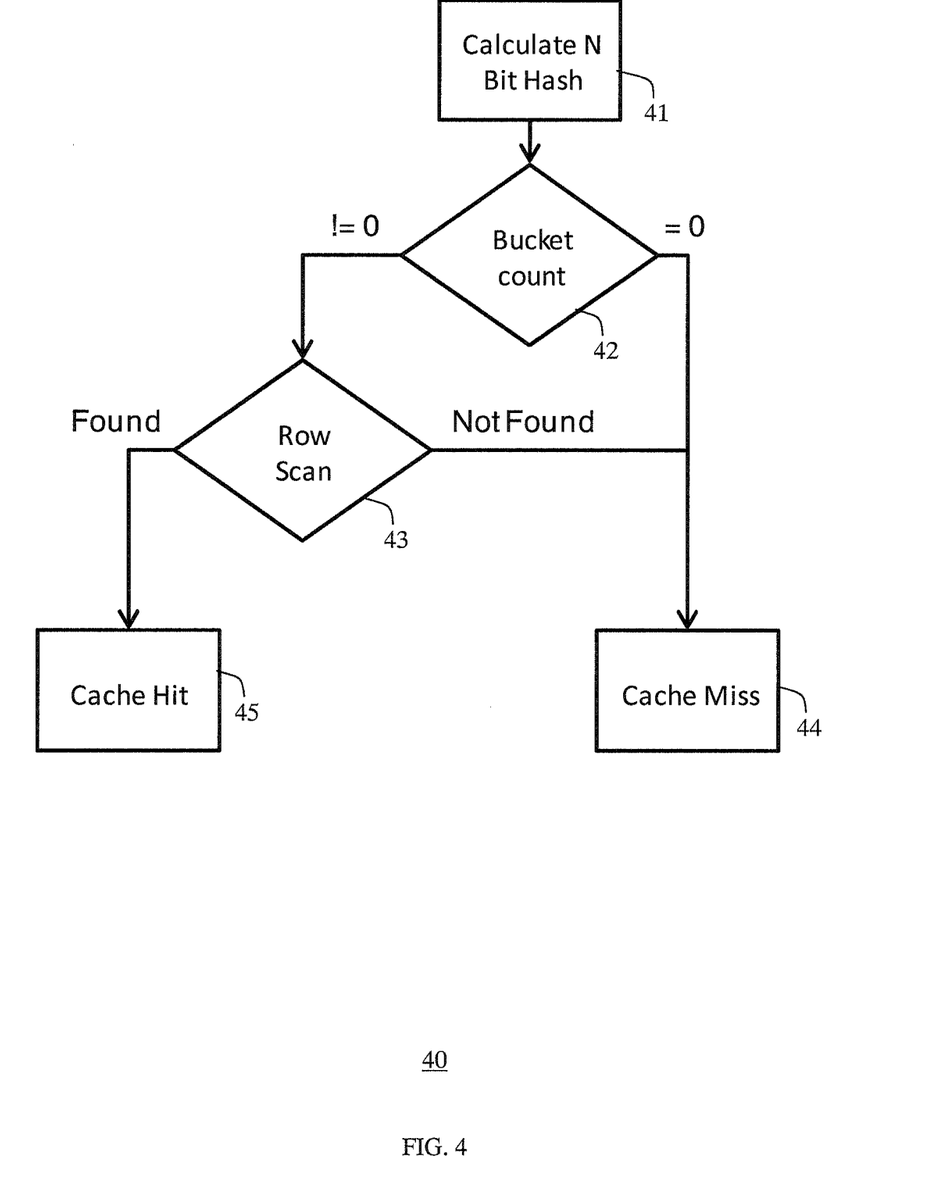
FIG. 4 shows a flowchart of a cache search process using said cache structure for the cache buffer, according to an embodiment of the invention.

FIG. 4 shows a flowchart of a cache search process 40 implemented by the cache controller 14 using said cache structure for the cache 11, according to an embodiment of the invention. Process block 41 comprises calculating an N bit hash value for a data item to be searched for in the cache. The hash value represents the LBA of the data item being searched for in the cache.

Process block 42 comprises determining the modified Bloom filter bucket count based on the hash value, wherein if the count is zero the process proceeds to process block 44 to declare a cache miss, otherwise the process proceed to process block 43. Specifically, the N bit hash value is used as an index into the modified counting Bloom filter. The Bloom filter indicates that either the target LBA is not in the cache or that it may be in the cache. If the indicated LBA is not in the cache then the search process stops as there is a cache miss.

Process block 43 comprises using the hash value as an index to a row of the hash table and scanning the row for the data item. If the data item is not found, then the process proceeds to process block 44 to declare a cache miss, otherwise the process proceeds to process block 45 to declare a cache hit. Specifically, M bits of the hash value are used as an index into the hash table, wherein the data items in the row associated with the hash value are scanned to determine if the data item is in the hash table. If the data item is in said associated row in the hash table, then there is a cache hit, otherwise there is a cache miss.

Figure 5:
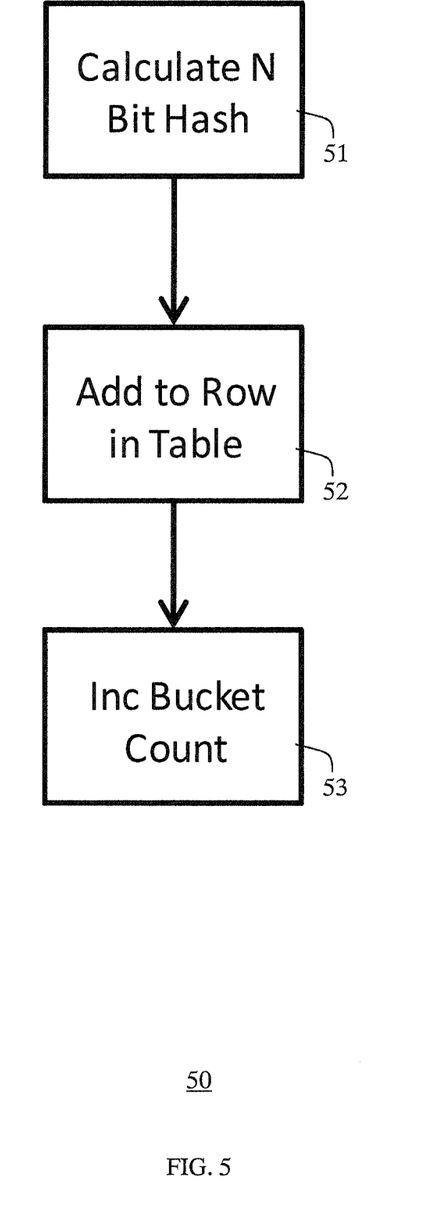
FIG. 5 shows a flowchart of a process for adding an entry to the cache buffer, according to an embodiment of the invention.

FIG. 5 shows a flowchart of an addition process 50 implemented by the cache controller 14 for adding a new entry (data item) to the cache 11, according to an embodiment of the invention. Process block 51 comprises calculating an N bit hash value for a new data item to be added to the cache 11. Process block 52 comprises adding an entry to the row in the hash table for the hash value of the new data item. Process block 53 comprises increasing Bloom filter bucket count, indicated by the hash value, to account for the new entry in the row in the hash table. Incrementing the bucket count may cause it to saturate.

Figure 6:
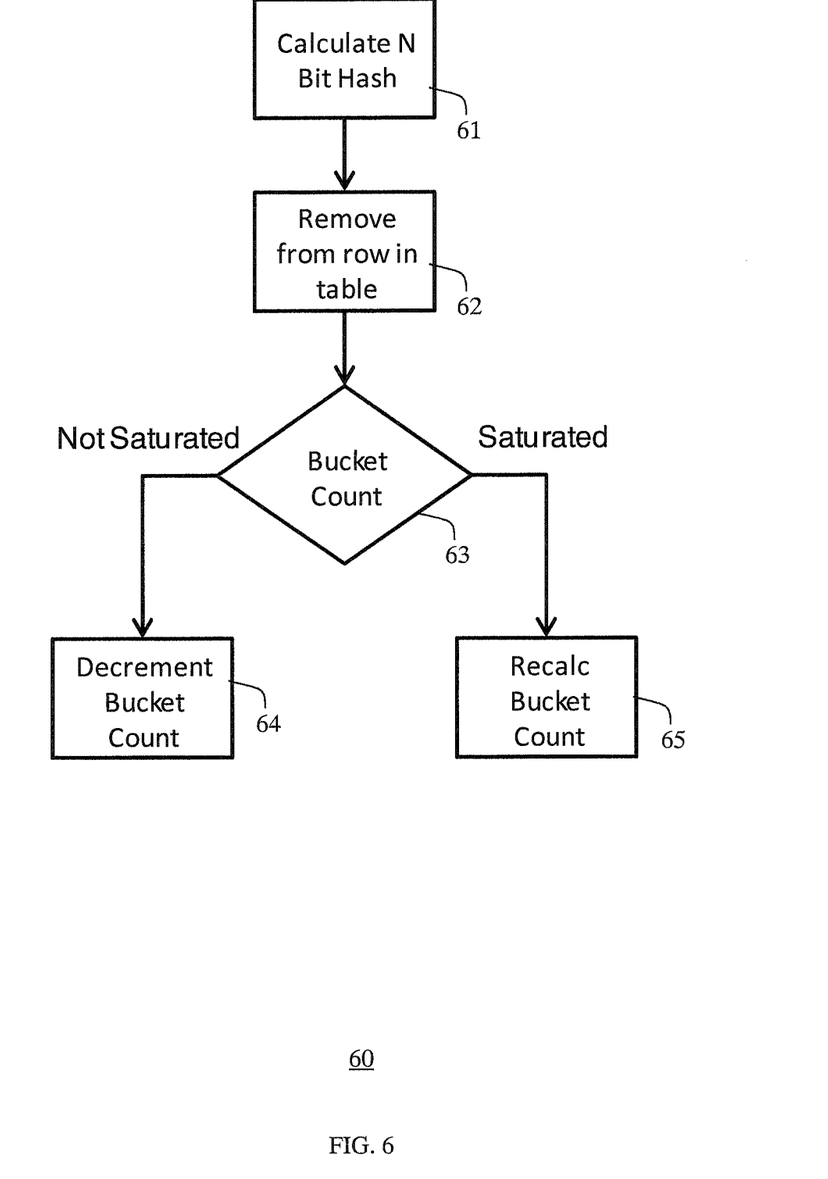
FIG. 6 shows a flowchart of a process for removing an entry from the cache buffer, according to an embodiment of the invention.

FIG. 6 shows a flowchart of a removal process 60 implemented by the cache controller 14 for removing an entry (item) from the cache 11, according to an embodiment of the invention. Process block 61 comprises calculating an N bit hash value for the data item to be removed from the cache 11. Process block 62 comprises removing an associated row from the hash table for the hash value of the data item (i.e., removing the data item from cache).

Process block 63 comprises determining if the Bloom filter bucket count, indicated by the hash, is saturated. If the bucket count is saturated, the process proceeds to process block 65 wherein a bucket count is recalculated for the Bloom filter. If the bucket count is not saturated, then the bucket count is decremented in process block 64. To recalculate the bucket count, a scan of the entire cache is not required. Only the row that is associated with the data item to be removed is scanned. This provides time saving such as in the example of having 256 rows in the hash table, 1/256 of the size of the cache need be scanned.

Figure 7:
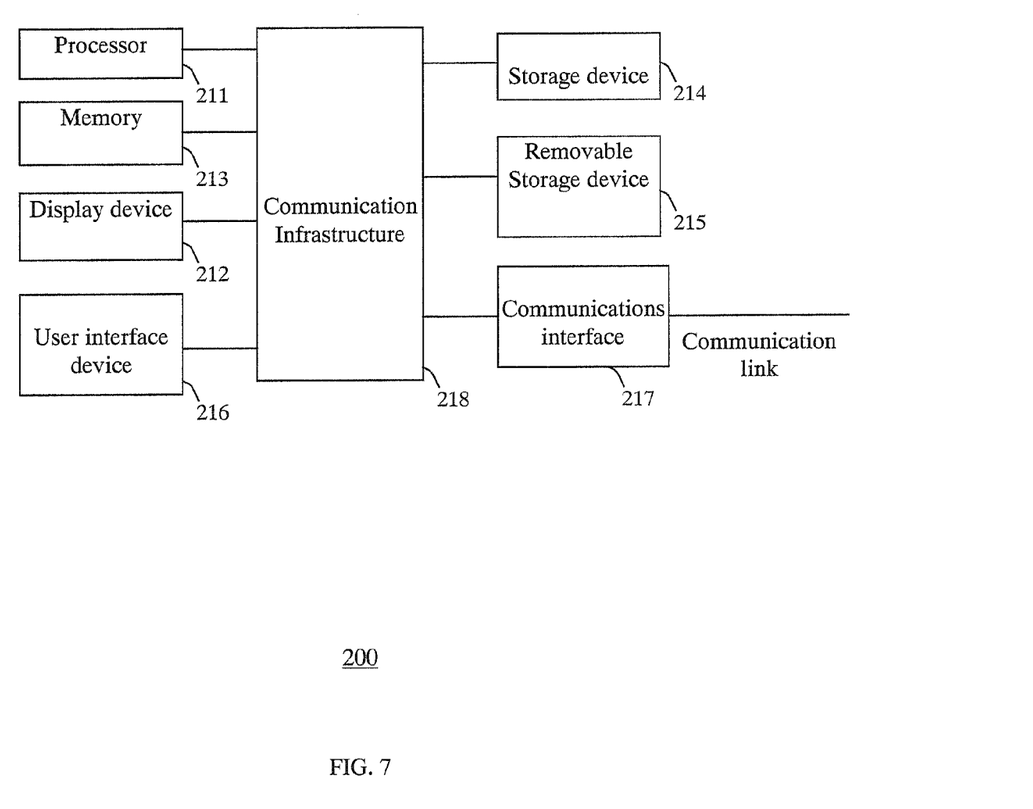
FIG. 7 is a high level block diagram showing an information processing system comprising a computer system useful for implementing an embodiment of the invention.

FIG. 7 is a high level block diagram showing an information processing system comprising a computer system 200 useful for implementing an embodiment of the present invention. The computer system 200 includes one or more processors 211, and can further include an electronic display device 212 (for displaying graphics, text, and other data), a main memory 213 (e.g., random access memory (RAM)), storage device 214 (e.g., hard disk drive), removable storage device 215 (e.g., removable storage drive, removable memory module, a magnetic tape drive, optical disk drive, computer readable medium having stored therein computer software and/or data), user interface device 216 (e.g., keyboard, touch screen, keypad, pointing device), and a communication interface 217 (e.g., modem, a network interface (such as an Ethernet card), a communications port, or a PCMCIA slot and card). The communication interface 217 allows software and data to be transferred between the computer system and external devices. The system 200 further includes a communications infrastructure 218 (e.g., a communications bus, cross-over bar, or network) to which the aforementioned devices/modules 211 through 217 are connected.

Information transferred via communications interface 217 may be in the form of signals such as electronic, electromagnetic, optical, or other signals capable of being received by communications interface 217, via a communication link that carries signals and may be implemented using wire or cable, fiber optics, a phone line, a cellular phone link, an radio frequency (RF) link, and/or other communication channels. Computer program instructions representing the block diagram and/or flowcharts herein may be loaded onto a computer, programmable data processing apparatus, or processing devices to cause a series of operations performed thereon to produce a computer implemented process.

Embodiments of the present invention have been described with reference to flowchart illustrations and/or block diagrams of methods, apparatus (systems) and computer program products according to embodiments of the invention. Each block of such illustrations/diagrams, or combinations thereof, can be implemented by computer program instructions. The computer program instructions when provided to a processor produce a machine, such that the instructions, which execute via the processor, create means for implementing the functions/operations specified in the flowchart and/or block diagram. Each block in the flowchart/block diagrams may represent a hardware and/or software module or logic, implementing embodiments of the present invention. In alternative implementations, the functions noted in the blocks may occur out of the order noted in the figures, concurrently, etc.

The terms "computer program medium," "computer usable medium," "computer readable medium", and "computer program product," are used to generally refer to media such as main memory, secondary memory, removable storage drive, a hard disk installed in hard disk drive. These computer program products are means for providing software to the computer system. The computer readable medium allows the computer system to read data, instructions, messages or message packets, and other computer readable information from the computer readable medium. The computer readable medium, for example, may include non-volatile memory, such as a floppy disk, ROM, flash memory, disk drive memory, a CD-ROM, and other permanent storage. It is useful, for example, for transporting information, such as data and computer instructions, between computer systems. Computer program instructions may be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

Computer programs (i.e., computer control logic) are stored in main memory and/or secondary memory. Computer programs may also be received via a communications interface. Such computer programs, when executed, enable the computer system to perform the features of the present invention as discussed herein. In particular, the computer programs, when executed, enable the processor and/or multi-core processor to perform the features of the computer system. Such computer programs represent controllers of the computer system.

Though the present invention has been described with reference to certain versions thereof; however, other versions are possible. Therefore, the spirit and scope of the appended claims should not be limited to the description of the preferred versions contained herein.

What is claimed is:

1. A method of cache management, comprising:
   maintaining a cache module comprising a hash table including rows of data items in a cache, wherein each row in the hash table is associated with a hash value representing a logical block address (LBA) of each data item in the respective row; and
   searching for a target data item in the cache by:
   calculating a hash value representing a LBA of the target data item;
   using the hash value to index into a counting Bloom filter that indicates that the target data item is either not in the cache, indicating a cache miss, or that the target data item may be in the cache; and if a cache miss is not indicated, using the hash value to select a row in the hash table, and indicating a cache miss if the target data item is not found in the selected row, wherein the method further comprises adding a new data item to the cache by:
calculating a hash value for the new data item;
adding a new item into a row of the hash table for the hash value of the new data item; and
increasing a corresponding bucket count for the new item added into the row of the hash table; and wherein the method further comprises removing a stored data item from the cache by:
calculating a hash value for the stored data item;
removing a row associated with the hash value for the stored data item from the hash table; and
if a corresponding bucket count is saturated, recalculating the corresponding bucket count by scanning only the row in the hash table associated with the corresponding bucket count being recalculated.

2. The method of claim 1, further comprising:
maintaining a relationship between the rows in the hash table and a set of buckets in the counting Bloom filter, wherein each data item in a row of the hash table is represented in a bucket in the counting Bloom filter that represents the respective row.

3. The method of claim 2, wherein:
each row in the hash table is divided into a series of slots representing regions of data item LBA space, wherein each slot is represented by a respective bucket in the counting Bloom filter.

4. The method of claim 3, further comprising:
utilizing the same hash value for indexing into the hash table and the Bloom filter according to said relationship between the buckets in the counting Bloom filter and the slots in the hash table.

5. The method of claim 4, wherein the counting Bloom filter has a larger number of buckets, than a number of the rows in the hash table, such that the number of buckets in the counting Bloom filter is an integer multiple of the number of the rows in the hash table.

6. The method of claim 5, further comprising:
utilizing a hash function of N bits for generating a hash value, wherein N is selected to enable the hash value to address any bucket in the counting Bloom filter;
wherein the maintaining the relationship between the rows in the hash table and the set of buckets in the counting Bloom filter comprises maintaining a relationship between N counting Bloom filter buckets and a single row in the hash table to reduce performance penalty of a counting Bloom filter bucket saturating.

7. The method of claim 1, wherein the calculating of the hash value comprises calculating the hash value using a multiplication hash function.

8. The method of claim 7, wherein the multiplication hash function provides random output distribution.

9. The method of claim 8, wherein the multiplication hash function is configured to process a value range that matches a range of the LBAs of the data items.

10. A cache system, comprising:
a cache controller that maintains a cache module comprising a hash table including rows of data items in a cache, wherein each row in the hash table is associated with a hash value representing a logical block address (LBA) of each data item in the respective row; and
a counting Bloom filter;

wherein the cache controller searches for a target data item in the cache by:
calculating a hash value representing a LBA of the target data item;
using the hash value to index into the counting Bloom filter that indicates that the target data item is either not in the cache, indicating a cache miss, or that the target data item may be in the cache; and
if a cache miss is not indicated, using the hash value to select a row in the hash table, and indicating a cache miss if the target data item is not found in the selected row, wherein the cache controller adds a new data item to the cache by:
calculating a hash value for the new data item;
adding a new item into a row of the hash table for the hash value of the new data item; and
increasing a corresponding bucket count for the new item added into the row in the hash table; and wherein the cache controller removes a stored data item from the cache by:
calculating a hash value for the stored data item;
removing a row associated with the hash value for the stored data item from the hash table; and
if a corresponding bucket count is saturated, recalculating the corresponding bucket count by scanning only the row in the hash table associated with the corresponding bucket count being recalculated.

11. The system of claim 10, wherein:
the cache controller maintains a relationship between the rows in the hash table and a set of buckets in the counting Bloom filter, wherein each data item in a row of the hash table is represented in a bucket in the counting Bloom filter that represents the respective row.

12. The system of claim 11, wherein:
each row in the hash table is divided into a series of slots representing regions of data item LBA space, wherein each slot is represented by a respective bucket in the counting Bloom filter.

13. The system of claim 12, wherein:
the cache controller utilizes the same hash value for indexing into the hash table and the counting Bloom filter according to said relationship between the buckets in the counting Bloom filter and the slots in the hash table.

14. The system of claim 13, wherein the counting Bloom filter has a larger number of buckets, than a number of the rows in the hash table, such that the number of buckets in the counting Bloom filter is an integer multiple of the number of the rows in the hash table.

15. The system of claim 14, wherein:
the cache controller utilizes a hash function of N bits for generating a hash value, wherein N is selected to enable the hash value to address any bucket in the counting Bloom filter; and
the cache controller maintains the relationship between the rows in the hash table and the set of buckets in the counting Bloom filter by maintaining a relationship between N counting Bloom filter buckets and a single row in the hash table to reduce performance penalty of a counting Bloom filter bucket saturating.

16. The cache system of claim 10, wherein the cache comprises a high speed memory buffer connected to a host system and a storage system.

17. The cache system of claim 16, wherein the storage system comprises a solid state drive medium.

18. A storage system, comprising:
a storage device which stores information; and a cache device, comprising:
  a cache controller that maintains a cache module comprising a hash table including rows of data items in a cache, wherein each row in the hash table is associated with a hash value representing a logical block address (LBA) of each data item in the respective row; and
  a counting Bloom filter;
  wherein the cache controller searches for a target data item in the cache by:
    calculating a hash value representing a LBA of the target data item;
    using the hash value to index into the counting Bloom filter that indicates that the target data item is either not in the cache, indicating a cache miss, or that the target data item may be in the cache; and
    if a cache miss is not indicated, using the hash value to select a row in the hash table, and indicating a cache miss if the target data item is not found in the selected row,
wherein the cache controller adds a new data item to the cache by:
  calculating a hash value for the new data item;
  adding a new item into a row of the hash table for the hash value of the new data item; and
  increasing a corresponding bucket count for the new item added into the row of the hash table, and
wherein the cache controller removes a stored data item from the cache by:
  calculating a hash value for the stored data item;
  removing a row associated with the hash value for the stored data item from the hash table; and
  if a corresponding bucket count is saturated, recalculating the corresponding bucket count by scanning only the row in the hash table associated with the corresponding bucket count being recalculated.

19. The system of claim 18, wherein:
the cache controller maintains a relationship between the rows in the hash table and a set of buckets in the counting Bloom filter, wherein each data item in a row of the hash table is represented in a bucket in the counting Bloom filter that represents the respective row.

20. The system of claim 19, wherein:
each row in the hash table is divided into a series of slots representing regions of data item LBA space, wherein each slot is represented by a respective bucket in the counting Bloom filter.

21. The system of claim 20, wherein:
the cache controller utilizes the same hash value for indexing into the hash table and the counting Bloom filter according to said relationship between the buckets in the counting Bloom filter and the slots in the hash table.

22. The system of claim 21, wherein the Bloom filter has a larger number of buckets, than a number of the rows in the hash table, such that the number of buckets in the counting Bloom filter is an integer multiple of the number of the rows in the hash table.

23. The system of claim 22, wherein:
the cache controller utilizes a hash function of N bits for generating a hash value, wherein N is selected to enable the hash value to address any bucket in the counting bloom filter; and
the cache controller maintains the relationship between the rows in the hash table and the set of buckets in the counting Bloom filter by maintaining a relationship between N counting Bloom filter buckets and a single row in the hash table to reduce performance penalty of a counting Bloom filter bucket saturating.

24. The storage system of claim 18, implemented as a solid state drive medium.

\* \* \* \* \*